(12) United States Patent
Iwakawa

(10) Patent No.: US 9,141,092 B2
(45) Date of Patent: Sep. 22, 2015

(54) FREQUENCY CONTROL DEVICE, FREQUENCY CONTROL METHOD

(71) Applicant: FUJITSU LIMITED, Kawasaki-shi (JP)

(72) Inventor: Akinori Iwakawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 447 days.

(21) Appl. No.: 13/718,239

(22) Filed: Dec. 18, 2012

(65) Prior Publication Data

US 2013/0261770 A1    Oct. 3, 2013

(30) Foreign Application Priority Data

Mar. 30, 2012 (JP) ................. 2012-083271

(51) Int. Cl.
- *G05B 11/01* (2006.01)
- *G05B 15/02* (2006.01)
- *H05B 37/02* (2006.01)

(52) U.S. Cl.
CPC ............. *G05B 11/01* (2013.01); *G05B 15/02* (2013.01); *H05B 37/0227* (2013.01); *G05B 2219/2642* (2013.01)

(58) Field of Classification Search
USPC ........... 700/276, 286; 340/552, 554; 713/300; 323/234
See application file for complete search history.

(56) References Cited

U.S. PATENT DOCUMENTS

| | | | | |
|---|---|---|---|---|
| 5,438,318 A | * | 8/1995 | Latorre et al. | 340/554 |
| 5,598,042 A | * | 1/1997 | Mix et al. | 307/116 |
| 5,781,108 A | * | 7/1998 | Jacob et al. | 340/552 |
| 7,657,763 B2 | * | 2/2010 | Nelson et al. | 713/300 |
| 8,175,756 B2 | * | 5/2012 | Musti et al. | 700/295 |
| 2003/0050737 A1 | * | 3/2003 | Osann, Jr. | 700/276 |
| 2006/0190538 A1 | | 8/2006 | Hwang et al. | |
| 2010/0318235 A1 | * | 12/2010 | Moss | 700/295 |
| 2013/0304268 A1 | * | 11/2013 | Pernia et al. | 700/286 |

FOREIGN PATENT DOCUMENTS

| | | |
|---|---|---|
| JP | 2004-134920 | 4/2004 |
| JP | 2005-20989 | 1/2005 |
| JP | 2006-228225 | 8/2006 |
| JP | 2007-156892 | 6/2007 |
| JP | 2009-159679 | 7/2009 |
| JP | 2009-259195 | 11/2009 |
| JP | 2011-197931 | 10/2011 |

* cited by examiner

*Primary Examiner* — Kidest Bahta
(74) *Attorney, Agent, or Firm* — Fujitsu Patent Center

(57) ABSTRACT

The object is to appropriately control a frequency of performing the link process.

A link device detects a movement of a user based on a result of a link process for linking an outlet and an electronic appliance used by the user. The link device also detects a scheduled event from a schedule of the user. In case an event is detected, the link device calculates a difference between a scheduled time when the event will occur and the current time, and increases a frequency of performing the link process as the calculated difference gets smaller. In case the movement detection unit does not detect a movement of the user by the scheduled event time, the link device increases the frequency of performing the link process larger than a current frequency being used.

7 Claims, 12 Drawing Sheets

FIG.4

| TIME | EVENT | PlaceID |
|---|---|---|
| 08:40:00 | ARRIVAL AT WORK | R0 |
| 10:00:00 | START OF MEETING | R1 |
| 12:00:00 | FINISH OF MEETING | |

FIG.5

| UserID | PCID |
|---|---|
| U1 | P1 |
| U2 | P2 |

FIG.6

| TIME DIFFERENCE | INTERVAL |
|---|---|
| LESS THAN 1 HOUR | 5 MINUTES |
| 1 HOUR OR MORE AND LESS THAN ONE DAY | 1 HOUR |
| ONE DAY OR MORE AND THREE DAYS OR LESS | 12 HOURS |

FIG.7

| TIME DIFFERENCE | INTERVAL |
|---|---|
| LESS THAN 30 MINUTES | 1 MINUTE |
| ∞ | ∞ |

FIG.8

| OutletID | | |
|---|---|---|
| C01 | C02 | C03 |

FIG.9

| UserID | TIME |
|---|---|
| U1 | 10:00:03 |
| U2 | 11:00:00 |

FIG.10

| PlaceID | OutletID | | |
|---|---|---|---|
| R1 | C01 | C02 | C03 |

FIG.11

| TIME | PlaceID | PCID |
|---|---|---|
| 08:40:00 | R0 | P1 |

FIG.12

| PCID | OutletID |
|---|---|
| P1 | C01 |
| P2 | C03 |
| P3 | C02 |

FIG.15

| TIME | POSITION | CHANGE | INTERVAL | NEXT DETERMINATION |
|---|---|---|---|---|
| 00:00:00 | UNKNOWN | NONE | 1 HOUR | 01:00:00 |
| 08:00:00 | UNKNOWN | NONE | 5 MINUTES | 08:05:00 |
| 08:31:00 | ARRIVAL AT WORK AND POWER ON PC | | | |
| 08:35:00 | USER'S DESK | CHANGED | 1 HOUR | 09:35:00 |
| 09:35:00 | USER'S DESK | NONE | 5 MINUTES | 09:40:00 |
| 10:00:00 | USER'S DESK | NONE | 1 MINUTE | 10:01:00 |
| 10:07:30 | MOVE TO CONFERENCE ROOM AND CONNECT PC TO POWER SOURCE | | | |
| 10:08:00 | CONFERENCE ROOM | CHANGED | 1 HOUR | 11:08:00 |

# FREQUENCY CONTROL DEVICE, FREQUENCY CONTROL METHOD

CROSS-REFERENCE TO RELATED APPLICATION

This application is based upon and claims the benefit of priority of the prior Japanese Patent Application No. 2012-083271, filed on Mar. 30, 2012, the entire contents of which are incorporated herein by reference.

FIELD

The embodiments discussed herein are directed to a frequency control device, a frequency control method.

BACKGROUND

Conventionally, because of the increase of environmental awareness and the rise in energy prices, the demand for efficient use of electric power is increasing in various fields. In offices, in order to aim at energy conservation of a whole department, individual use of electric power is grasped in small unit. In recent years, an energy management system to grasp power consumption of individuals by distributing power outlets, which have power measuring function, called smart outlets is popular.

Such an energy management system increases cost in an office where layout is often changed, in a conference room having outlets whose users often change, in an office where individual desks are not fixed, called non-territorial office, and the like. Therefore, a mechanism for automatically linking appliances and outlets are proposed.

For example, there is a known method for equipping plugs with RFIDs (Radio Frequency Identification) having IDs of appliances, and for reading the RFIDs by RFID readers provided in outlets so as to associate appliances and outlets. In addition, there is a known method for outputting a command to generate a specific power consumption pattern from a server to an appliance, and for detecting the same power pattern on the outlet side, thereby associating appliances and outlets. Further, there is a known technique of sending an appliance ID when the condition of the appliance changes, and of associating the appliance with an outlet having power change at that time. Related-art examples are described in Japanese Laid-open Patent Publication No. 2006-228225, Japanese Laid-open Patent Publication No. 2011-197931, and Japanese Laid-open Patent Publication No. 2004-134920.

However, the technique that uses RFID increases cost since special outlets with RFIDs are used. In addition, the technique that outputs a command from server decreases usability since resource is consumed regardless of the intention of users. Further, the technique that sends an appliance ID increases a rate of erroneous decision since the number of outlets whose power change at the same time is large in an environment where multiple appliances operate at the same time, such as in an office.

On the other hand, there is also a conceivable technique that links time-series data of power consumption measured at outlets and resource consumption data of electric appliances such as PCs plugged into the outlets by calculating correlation therebetween. However, this technique is difficult to secure scalability, and thus it is difficult to control the frequency of performing the link process, which is disadvantageous.

Specifically, since a link of actual appliances dynamically changes by various factors, it is desirable to update link data in real time to follow the change. Therefore, data is periodically acquired in order to address a case where event load information is difficult to be registered from an appliance side upon movement of the appliance in a case where a network environment is difficult to be provided immediately, for example. However, in order to frequently update the correlation, information is acquired and correlation is calculated frequently. These processes deteriorate performance of a server that calculates the correlation. As described above, it is difficult to secure scalability, and thus the frequency of performing the link process is difficult to be appropriately controlled.

SUMMARY

According to an aspect of an embodiment, a frequency control device includes a movement detection unit that detects a movement of a user based on a result of a link process for linking an outlet and an electronic appliance that is used by the user; an event detection unit that detects a scheduled event from a schedule of the user; a first changing unit that calculates, in case the event detection unit detects an event, a difference between a scheduled time when the event will occur and a current time, and increases the frequency of performing the link process as the calculated difference gets smaller; and a second changing unit that increases the frequency of performing the link process to be larger than a current frequency being used after an occurrence time of the event detected by the event detection unit in case the movement detection unit does not detect a movement of the user by the time.

According to another aspect of an embodiment, a frequency control method includes detecting a movement of a user based on a result of a link process for linking an outlet and an electronic appliance used by the user; detecting a scheduled event from a schedule of the USER; in case an event is detected, calculating a difference between a scheduled time when the event will occur and a current time, and increases a frequency of performing the link process as the calculated difference gets smaller; and increasing a frequency of performing the link process to be larger than a current frequency being used after an occurrence time of the detected event in case a movement of the user is not detected by the time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a schedule;

FIG. 5 is a diagram illustrating an example of information stored in a user appliance table;

FIG. 6 is a diagram illustrating an example of information stored in a previous frequency table;

FIG. 7 is a diagram illustrating an example of information stored in a following frequency table;

FIG. 8 is a diagram illustrating an example of information stored in a candidate outlet table;

FIG. 9 is a diagram illustrating an example of information stored in an acquiring time table;

FIG. 10 is a diagram illustrating an example of information stored in an outlet place table;

FIG. 11 is a diagram illustrating an example of information stored in a position history table;

FIG. 12 is a diagram illustrating an example of information stored in a link result table;

FIG. 15 is a diagram for explaining a specific example of the frequency determination;

DESCRIPTION OF EMBODIMENTS

Preferred embodiments of the present invention will be explained with reference to accompanying drawings. Note that the present invention is not limited by the embodiments.

[a] First Embodiment

Overall Configuration

Figure 1:
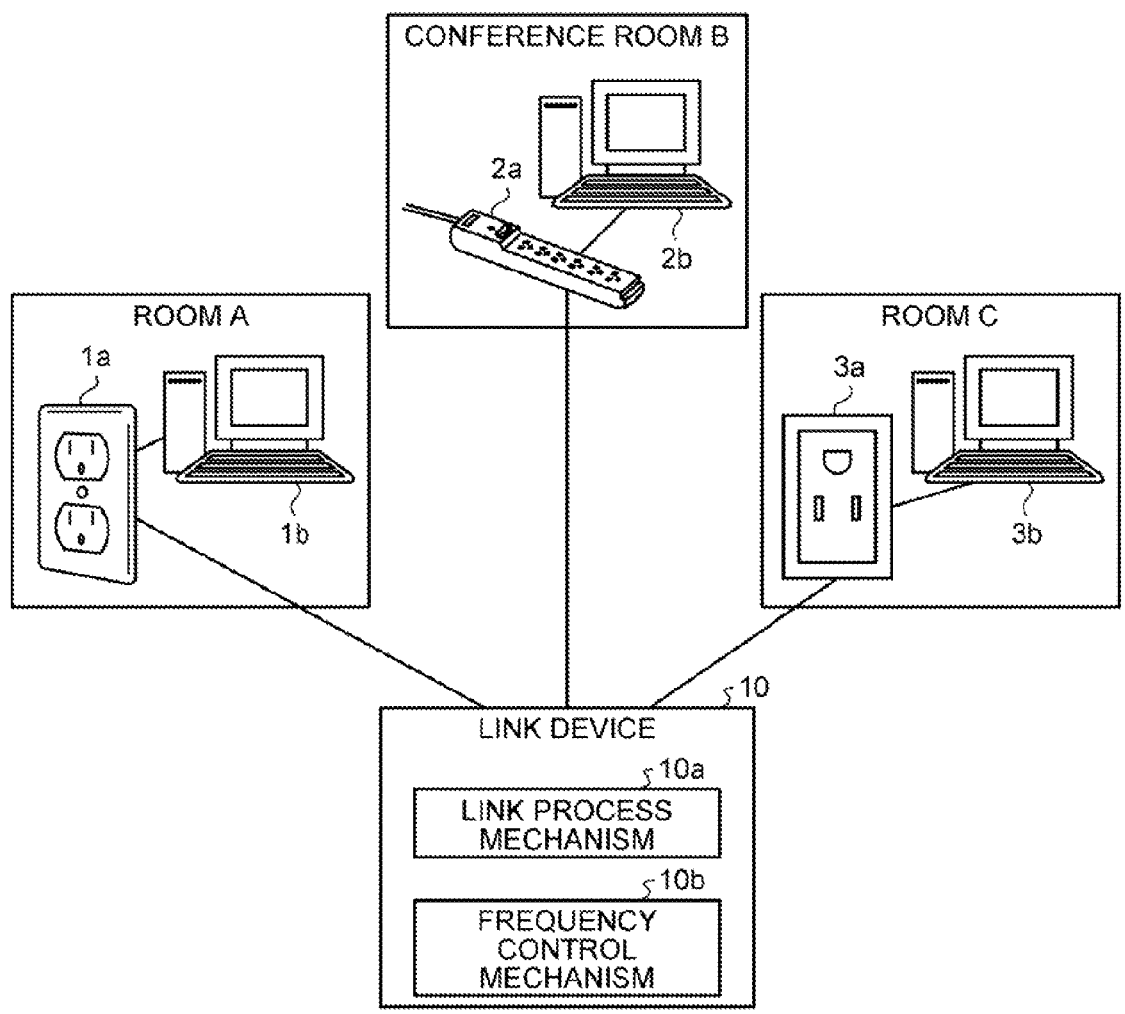
FIG. 1 is a diagram illustrating an example of an overall configuration of a system according to first embodiment.

FIG. 1 is a diagram illustrating an example of an overall configuration of a system according to a first embodiment. As illustrated in FIG. 1, this system includes a link device 10, a room A, a conference room B, and a room C. In the room A, an outlet 1a and a user terminal 1b that is plugged into the outlet 1a to consume power are placed. In the conference room B, an outlet 2a and a user terminal 2b that is plugged into the outlet 2a to consume power are placed. In the room C, an outlet 3a and a user terminal 3b that is plugged into the outlet 3a to consume power are placed.

The outlets 1a, 2a, and 3a can measure power consumption. For example, each outlet can measure power consumed by a user terminal plugged into the each outlet by measuring power supplied for each plug insertion hole.

The link device 10 is a device that is plugged into each of the outlets 1a, 2a, and 3a, and that links user terminals and outlets. This link device 10 has a link process mechanism 10a and a frequency control mechanism 10b.

The link process mechanism 10a is a processor that links user terminals and outlets. The link process mechanism 10a can link user terminals and outlets by using various known techniques. For example, the link process mechanism 10a links them by calculating a correlation between time-series data of power consumption measured by respective outlets and data of resource consumption of user terminals plugged into the outlets.

The frequency control mechanism 10b is a processor that controls a frequency of link processes performed by the link process mechanism 10a. Specifically, the frequency control mechanism 10b detects a movement of a user based on a result of a link process performed by the link process mechanism 10a. The frequency control mechanism 10b also detects a scheduled event referring to a schedule of a user. Then, when a scheduled event is detected, the frequency control mechanism 10b calculates a difference between a scheduled time when the scheduled event will occur and the current time, and increases a frequency of performing the link process as the calculated difference gets smaller. If a movement of a user is not detected by the occurrence time of the detected event, the frequency control mechanism 10b also increases the current frequency of performing the link process thereafter.

Figure 2:
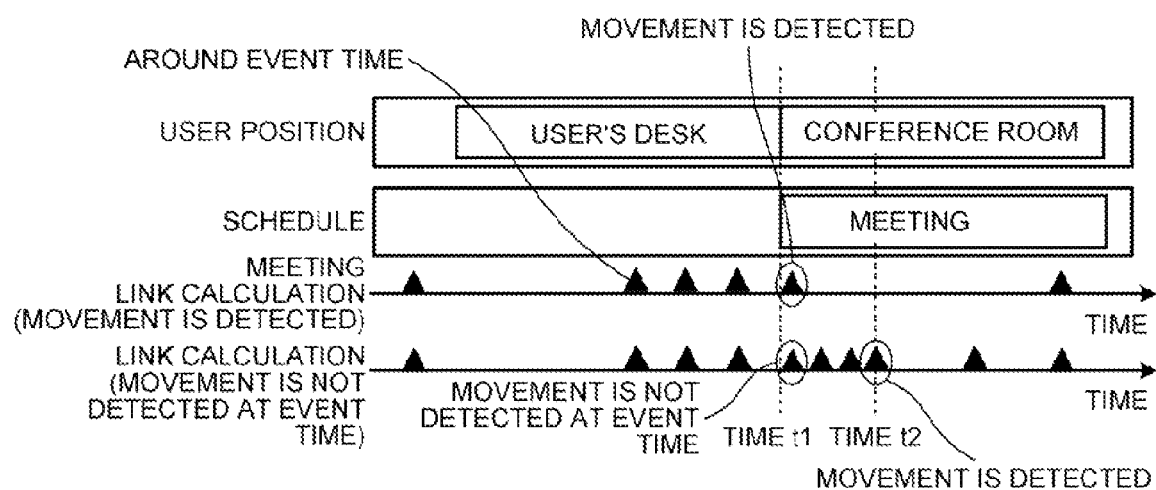
FIG. 2 is a diagram for explaining an example of adjusting a link frequency.

Hereinafter, the frequency control performed by the frequency control mechanism 10b will be described. FIG. 2 is a view for explaining an example of adjusting the link frequency. As illustrated in FIG. 2, a user has a schedule to move from his/her desk to a conference room at a time t1 to have a meeting. In such a situation, the frequency control mechanism 10b increases the frequency of performing the link process as the meeting time gets closer with the user staying at his/her desk. After that, if the frequency control mechanism 10b detects at the start time of the meeting t1 that the user has moved to the conference room, it decreases the frequency of performing the link process.

On the other hand, if the frequency control mechanism 10b detects that the user still stays at his/her desk at the start time of the meeting t1, it increases the frequency of performing the link process since the user has not moved to the conference room. After that, if the frequency control mechanism 10b detects at time t2 after the start time of the meeting that the user has moved to the conference room, it decreases the frequency of performing the link process.

As described above, the frequency control mechanism 10b can shorten an interval of time between the link processes as the scheduled time gets closer, and can shorten the interval of time between the link processes if it detects that the user has not moved after the scheduled time. As a result, scalability can be secured, and the frequency of performing the link process can be appropriately controlled.

Link Device Configuration

Figure 3:
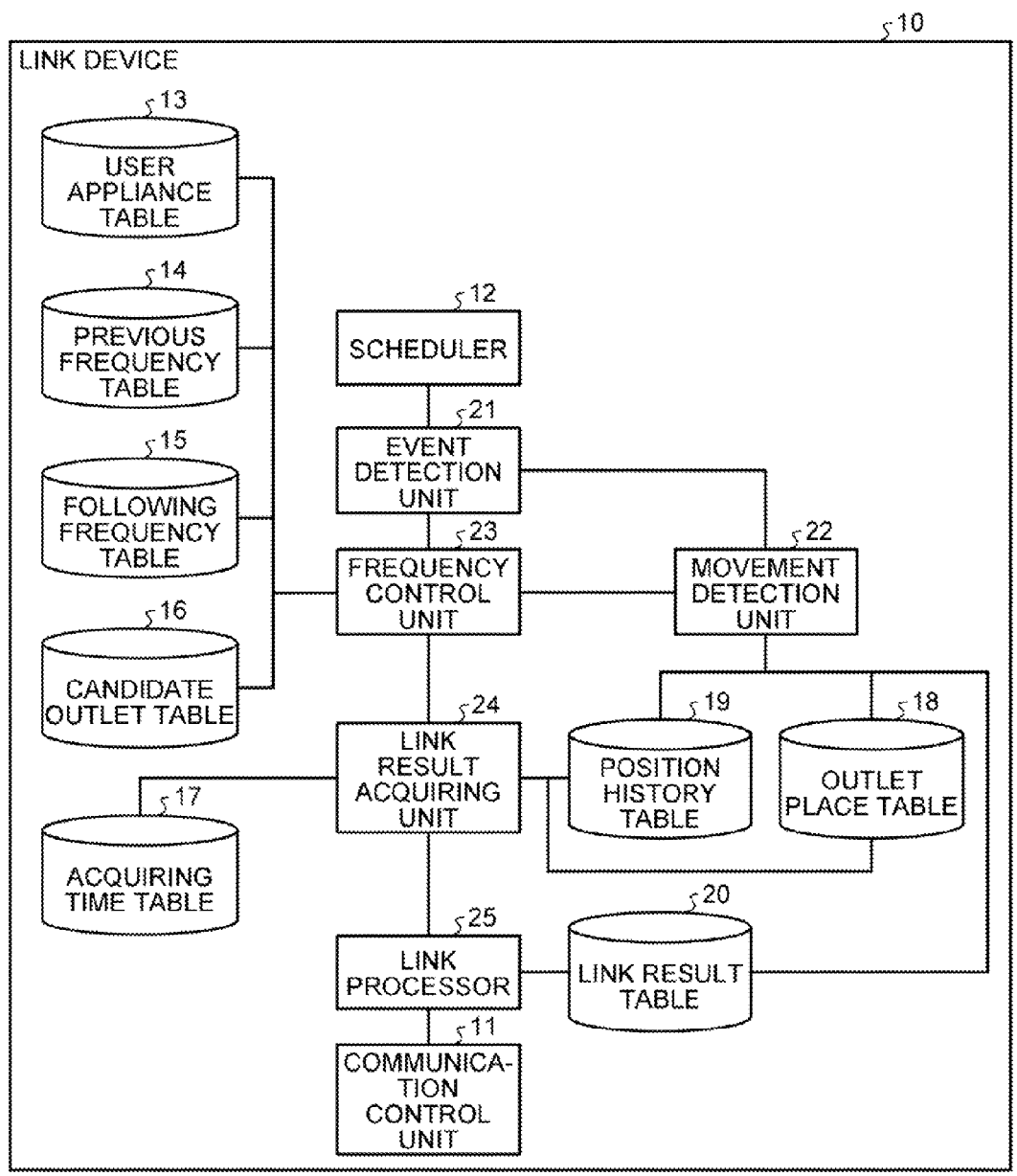
FIG. 3 is a functional block diagram illustrating a configuration of a link device.

Next, the configuration of the link device illustrated in FIG. 1 will be described. A case where the link process mechanism 10a and the frequency control mechanism 10b are implemented in the same chassis will be described as an example, but the invention is not limited thereto and they can be implemented in separate chassis. FIG. 3 is a functional block diagram illustrating the f the link device.

As illustrated in FIG. 3, the link device 10 includes a communication control unit 11, a scheduler 12, a user appliance table 13, a previous frequency table 14, a following frequency table 15, a candidate outlet table 16, and an acquiring time table 17. The link device 10 further includes an outlet place table 18, a position history table 19, a link result table 20, an event detection unit 21, a movement detection unit 22, a frequency control unit 23, a link result acquiring unit 24, and a link processor 25. Each processor is a processor implemented by an electronic circuit such as a CPU (Central Processing Unit), and each table is provided in a storage device such as a memory.

The communication control unit 11 is a processor that connects to each outlet to control communications with the each outlet. For example, the communication control unit 11 receives a power consumption value from the each outlet and output the power consumption value to the link processor 25. The communication control unit 11 also connects to a user terminal to acquire load information and the like from the user terminal and output the load information to the link processor 25.

The scheduler 12 stores a schedule for each user. FIG. 4 is a diagram illustrating an example of a schedule. As illustrated in FIG. 4, the scheduler 12 stores "Time, Event, and PlaceID"

in association with each other. The information stored here is set and updated by an administrator or the like. Here, a schedule of one user will be described as an example.

The "Time" indicates a scheduled time when an event will occur. The "Event" indicates a content of the schedule. The "PlaceID" indicates a place where the event will occur and an identifier indicating a place is set, for example. In a case of FIG. 4, the schedule indicates that an event "Arrival at work" occurs at "08:40:00" in a place "R0", an event "Start of meeting" occurs at "10:00:00" in a place "R1", and an event "Finish of meeting" occurs at "12:00:00".

The user appliance table 13 stores information of electronic appliances used by users. Specifically, the user appliance table 13 stores identifiers of users and identifiers of electronic appliances used by the users in association with each other. FIG. 5 is a diagram illustrating an example of information stored in the user appliance table. As illustrated in FIG. 5, the user appliance table 13 stores "UserID and PCID" in association with each other. The information stored here is set and updated by an administrator or the like.

The "UserID" is an identifier for identifying a user, and "PCID" is an identifier for identifying an electronic appliance used by a user. In a case of FIG. 5, it is indicated that a user U1 uses an electronic appliance P1, and a user U2 uses an electronic appliance P2. An electronic appliance can be a personal computer and the like, for example.

The previous frequency table 14 stores information for determining, before the time when the event will occur, the frequency of the link process based on a time difference between the current time and the time when an event will occur. FIG. 6 is a diagram illustrating an example of information stored in the previous frequency table. As illustrated in FIG. 6, the previous frequency table 14 stores "Time difference and Interval" in association with each other. The information stored here is set and updated by an administrator or the like.

The "Time difference" indicates a difference between the current time, which in other words is a time when the frequency is adjusted, and a start time of events stored in the scheduler 12. The "Interval" indicates the interval of time between successive link processes. In a case of FIG. 6, it is indicated that the link process is performed at the time interval of 5 minutes when the time difference is "Less than 1 hour", i.e., there is less than 1 hour left before the event will start. The previous frequency table also indicates that the link process is performed at a time interval of 1 hour when the time difference is "1 hour or more and less than one day". The previous frequency table also indicates that the link process is performed at a time interval of twelve hours when the time difference is "One day or more and three days or less", i.e., when there is one to three days left before the event will start.

The following frequency table 15 stores information for determining the frequency of the link process based on a time difference between the event occurrence time that is past and the current time until certain time after the event occurrence time. FIG. 7 is a diagram illustrating an example of information stored in the following frequency table. As illustrated in FIG. 7, the following frequency table 15 stores "Time difference, Interval" in association with each other. The information stored here is set and updated by an administrator or the like.

The "Time difference" is a difference between the current time, which in other words is a time when the frequency is adjusted, and a start time of events stored in the scheduler 12. "Interval" indicates the interval of time between successive link processes. In a case of FIG. 7, it is indicated that the link process is performed at a time interval of 1 minute when a time elapsed after the event start time is "Less than 30 minutes".

The candidate outlet table 16 stores information of outlets to be linked. The candidate outlet table 16 is a table made by the frequency control unit 23 referring to the position history table 19 and the outlet place table 18. FIG. 8 is a diagram illustrating an example of information stored in the candidate outlet table. As illustrated in FIG. 8, the candidate outlet table 16 stores "OutletID". As the "OutletID", identifiers for identifying outlets to be linked are set. In a case of FIG. 8, it is indicated that three outlets identified with C01, C02, and C03 respectively are to be linked.

The acquiring time table 17 stores times when link results are acquired. This acquiring time table 17 is made by the link result acquiring unit 24. FIG. 9 is a diagram illustrating an example of information stored in the acquiring time table. As illustrated in FIG. 9, the acquiring time table 17 stores "UserID and Time" in association with each other.

"UserID" is an identifier for identifying a user, and "Time" is a time when a link result is acquired. In a case of FIG. 9, it is indicated that a link result of a user U1 is acquired at the time "10:00:03" and that a link result of a user U2 is acquired at the time "11:00:00".

The outlet place table 18 stores information indicating in which place which outlet is placed. FIG. 10 is a diagram illustrating an example of information stored in the outlet place table. As illustrated in FIG. 10, the outlet place table 18 stores "PlaceID and OutletID" in association with each other. The information stored here is set and updated by an administrator or the like.

The "PlaceID" is an identifier for identifying a place, and the "OutletID" is an identifier for identifying an outlet. In a case of FIG. 10, it is indicated that three outlets each having the OutletID "C01", "C02", and "C03" are located in a PlaceIDentified with a PlaceID "R1".

The position history table 19 stores information indicating a history of positions where a user was. This position history table 19 is made by the movement detection unit 22. FIG. 11 is a diagram illustrating an example of information stored in the position history table. As illustrated in FIG. 11, the position history table 19 stores "Time, PlaceID, and PCID" in association with each other. Since each piece of information stored here is described above, its detailed description will not be repeated. In a case of FIG. 11, a user having a PCID "P1" was in a PlaceIDentified with a PlaceID "R0" at a time "08:40:00".

The link result table 20 stores link results by the link processor 25. FIG. 12 is a diagram illustrating an example of information stored in the link result table. As illustrated in FIG. 12, the link result table 20 stores "PCID and OutletID" in association with each other. Since each piece of information stored here is described above, its detailed description will not be repeated. In a case of FIG. 12, is indicated that the electronic appliance "P1" uses the OutletID "C01", an electronic appliance "P2" uses the OutletID "C03", and an electronic appliance "P3" uses the OutletID "C02".

The event detection unit 21 is a processor that detects a scheduled event from a schedule of a user. Specifically, the event detection unit 21 detects events stored in the scheduler 12 in sequence referring to the scheduler 12. For example, the event detection unit 21 detects by referring to FIG. 4 that an event "arrival at work" is scheduled at "08:40:00", and outputs the detected content to the frequency control unit 23. When the movement detection unit 22 thereafter detects a movement of the user, the event detection unit 21 detects that an event "Start of meeting" is scheduled as a next event at "10:00:00", and outputs the detected content to the frequency control unit 23. In this way, the event detection unit 21 extracts events stored in the scheduler 12 in sequences referring to the scheduler 12.

The movement detection unit 22 is a processor that detects a movement of a user based on a result of a link process for linking an outlet and an electronic appliance used by a user. Specifically, the movement detection unit 22 identifies a position of a user referring to the link result table 20 and the outlet place table 18, and then compares the identified position with the most recent position stored in the position history table 19, thereby detecting that a movement has occurred when they are different.

For example, the movement detection unit 22 identifies that the PCID "P1" is associated with the OutletID "C01" based on the most recent association stored in the link result table 20. The movement detection unit 22 then refers to the outlet place table 18 so as to identify that a PlaceID associated with the identified OutletID "C01" is "R1". Then, the movement detection unit 22 refers to the position history table 19 to identify that the most recent PlaceID associated with the PCID "P1" is "R0". Thereafter, the movement detection unit 22 detects that the user has moved since the PlaceID "R1" identified referring to the link result table 20 and the PlaceID "R0" identified referring to the position history table 19 are different.

In this case, the movement detection unit 22 updates the position history table 19 with the PlaceID "R1" identified referring to the link result table 20. The movement detection unit 22 then outputs to the frequency control unit 23 and the event detection unit 21 that it has detected a movement of the user. Note that the movement detection unit 22 is triggered to perform the process at a time when it receives a notification from the link result acquiring unit 24, for example.

The frequency control unit 23 is a processor that calculates a difference between a scheduled time when an event will occur and the current time to increase the frequency of performing the link process as the calculated difference gets smaller. The frequency control unit 23 is also a processor that increases the frequency of performing the link process larger than a current frequency after the occurrence time of the event detected by the event detection unit 21 if the movement detection unit 22 does not detect a movement of the user.

Specifically, the frequency control unit 23 refers to the event previous frequency table 14 before the event time and before detection of a movement to determine the frequency of the link process. The frequency control unit 23 also determines the frequency of the link process referring to the following frequency table 15 after the event time and before detection of a movement. In other words, the frequency control unit 23 determines the frequency referring to the previous frequency table 14 when it controls the frequency of the link process beforehand in preparation to an event to occur according to a schedule. On the other hand, the frequency control unit 23 determines the frequency referring to the following frequency table 15 when it controls the frequency of the link process in preparation to an event to occur behind the schedule.

For example, when the current time is "08:00:00", the frequency control unit 23 calculates the time difference to be "40 minutes" because the scheduled time when an event will occur is "08:40:00". The frequency control unit 23 then refers to the previous frequency table 14 to identify the interval associated with the time difference "40 minutes" to be "5 minutes". Thereafter, the frequency control unit 23 instructs the link processor 25 through the link result acquiring unit 24 to perform the link process at the interval of "5 minutes".

Further, when the current time is "10:05:00" and a movement is not yet detected, the frequency control unit 23 calculates the time difference to be "5 minutes" because the scheduled time when an event will occur is "10:00:00". The frequency control unit 23 then refers to the following frequency table 15 since a movement is not yet detected even though it's after the event occurrence time. Thereafter, the frequency control unit 23 identifies the interval associated with the time difference "5 minutes" to be "1 minute". Then, the frequency control unit 23 instructs the link processor 25 through the link result acquiring unit 24 to perform he link process at the interval of "1 minute".

This frequency control unit 23 also makes the candidate outlet table 16. Specifically, if the event detection unit 21 detects an event, the frequency control unit 23 identifies from the scheduler 12 that a place associated with the event. The frequency control unit 23 then narrows down outlets to be linked by identifying information of an outlet associated with the identified place from the outlet place table 18.

For example, if the event detection unit 21 detects the event "Start of meeting", the frequency control unit 23 identifies from the scheduler 12 the PlaceID "R1" associated with the event "Start of meeting". The frequency control unit 23 then identifies the OutletIDs "C01, C02, and C03" associated with the PlaceID "R1" referring to the outlet place table 18 through the movement detection unit 22. Thereafter, the frequency control unit 23 stores the identified OutletID "C01, C02, and C03" in the candidate outlet table 16, and outputs the identified information to the link processor 25.

Referring back to FIG. 3, the link result acquiring unit 24 is a processor that acquires the link result acquired by the link processor 25. For example, the link result acquiring unit 24 refers to the link result table 20 through the link processor 25 to acquire association between the PCID and the OutletID when it is notified from the link processor 25 that the link process has finished. The link result acquiring unit 24 then outputs the acquired association between the PCID and the OutletID to an upper level application or the like. The link result acquiring unit 24 thereafter updates the acquiring time table with the acquired time. The link result acquiring unit 24 also outputs to the frequency control unit 23 and the movement detection unit 22 that the link process has finished.

The link processor 25 is a processor that links user terminals and outlets at the frequency instructed by the frequency control unit 23. The link processor 25 can link user terminals and outlets using various known technique. The link processor 25 links them by calculating correlation between time-series data of power consumption measured at the each outlet and resource consumption data of user terminals plugged into the outlets, for example. The link processor 25 then stores the link result in the link result table 20, and notifies the link result acquiring unit 24 that the link process has finished.

For example, the link processor 25 performs the link process at a time interval of 1 minute if it is instructed to set the time interval to 1 minute by the frequency control unit 23. An example of the link process will also be described. The link processor 25 acquires device usage rates and time of the usages within a certain amount of time from the user terminals. The link processor 25 also acquires, from all outlets, all power consumption corresponding to the time data acquired from the user terminals. The link processor 25 then calculates correlation between the device usage rates of the user terminals and the power consumption data by using Pearson's coefficient or the like. Thereafter, the link processor 25 determines the link between the user terminals and the outlets based on the correlation.

At this time, if there are a plurality of outlets that can be linked to user terminals, the link processor 25 can narrow down the outlets to be candidates from the candidate outlet table 16. In the situation that the outlet is narrowed down, the link processor 25 may also perform the link process by acquiring the device usage rates using the narrowed down outlets from the user terminals.

Process Flow

The movement determination process and the frequency control process will now be described.

Movement Determination Process

Figure 13:
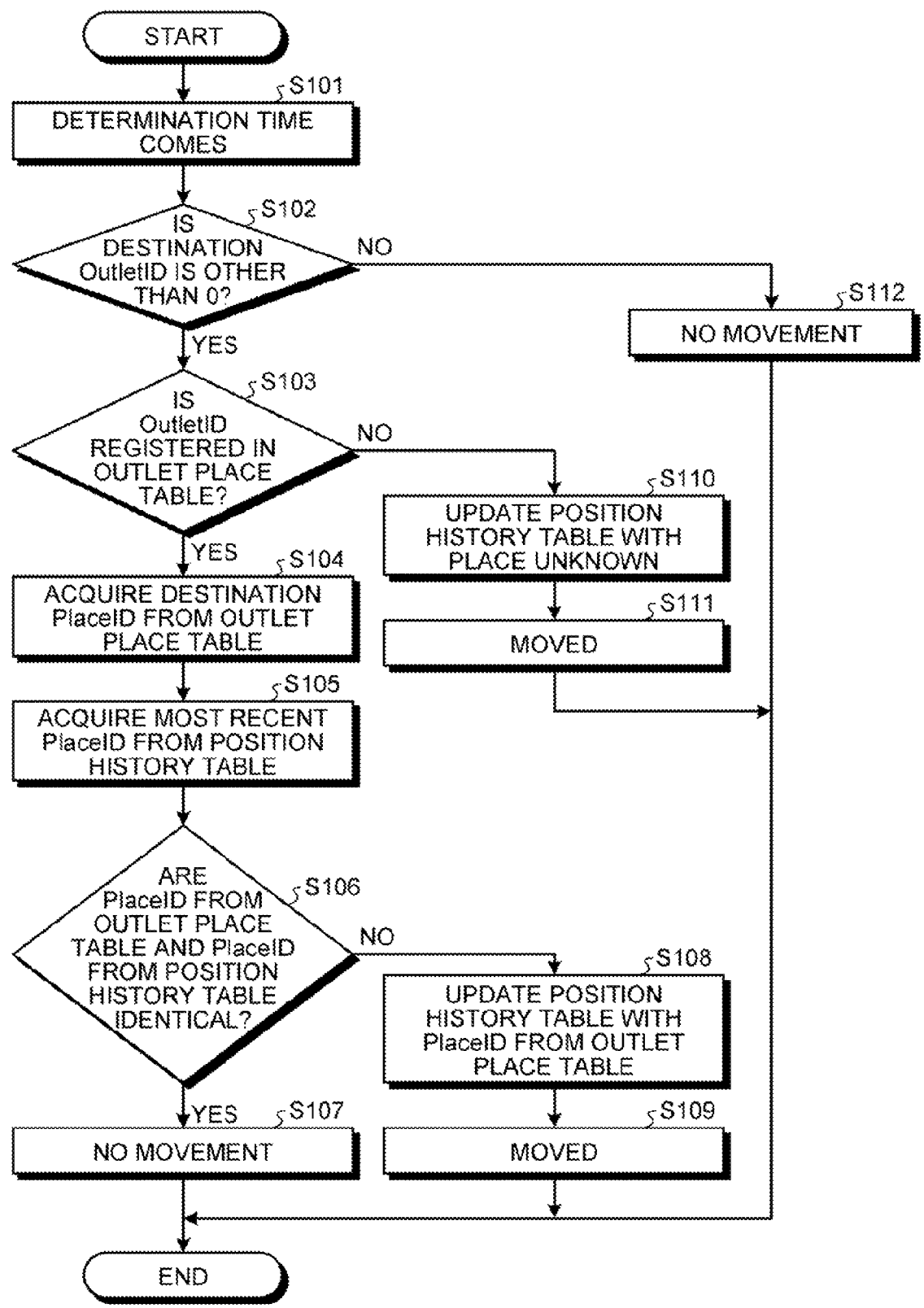
FIG. 13 is a flowchart illustrating a flow of a movement determination process.

FIG. 13 is a flowchart illustrating a flow of the movement determination process. As illustrated in FIG. 13, when a determination time comes (S101), the movement detection unit 22 of the link device 10 refers to the link result table 20 to determine whether a destination OutletID is 0 or other than 0 (S102). In other words, the movement detection unit 22 acquires an OutletID linked to a PCID that is used by the target user, and determines whether the acquired OutletID is 0 or other than 0.

Then, if the movement detection unit 22 determines that the destination OutletID is other than 0 (S102 Yes), it determines whether the OutletID is registered in the outlet place table 18 or not (S103).

Next, if the movement detection unit 22 determines that the OutletID is registered in the outlet place table 18 (S103 Yes), it refers to the outlet place table 18 to acquire a PlaceID associated with the OutletID (S104).

The movement detection unit 22 further refers to the position history table 19 to acquire the most recent PlaceID associated with the PCID that is currently the target of the process (S105). Whether the PlaceID is the most recent or not can be determined based on time or the like.

Then, if the PlaceID acquired from the outlet place table 18 and the PlaceID acquired from the position history table 19 are identical (S106 Yes), the movement detection unit 22 determines that there has been no movement (S107).

On the other hand, if the PlaceID acquired from the outlet place table 18 and the PlaceID acquired from the position history table 19 are not identical (S106 No), the movement detection unit 22 updates the position history table 19 with the PlaceID acquired from the outlet place table 18 (S108). The movement detection unit 22 then determines that there has been a movement (S109).

If the movement detection unit 22 determines that the OutletID is not registered in the outlet place table 18 (S103 No) in S103, it updates the position history table 19 with place unknown (S110). The movement detection unit 22 then determines that there has been a movement (S111).

If the movement detection unit 22 determines that the destination OutletID is other than 0 (S102 No) in S102, i.e., it determines that the destination OutletID is 0, it determines that there has been no movement (S112).

Frequency Control Process

Figure 14:
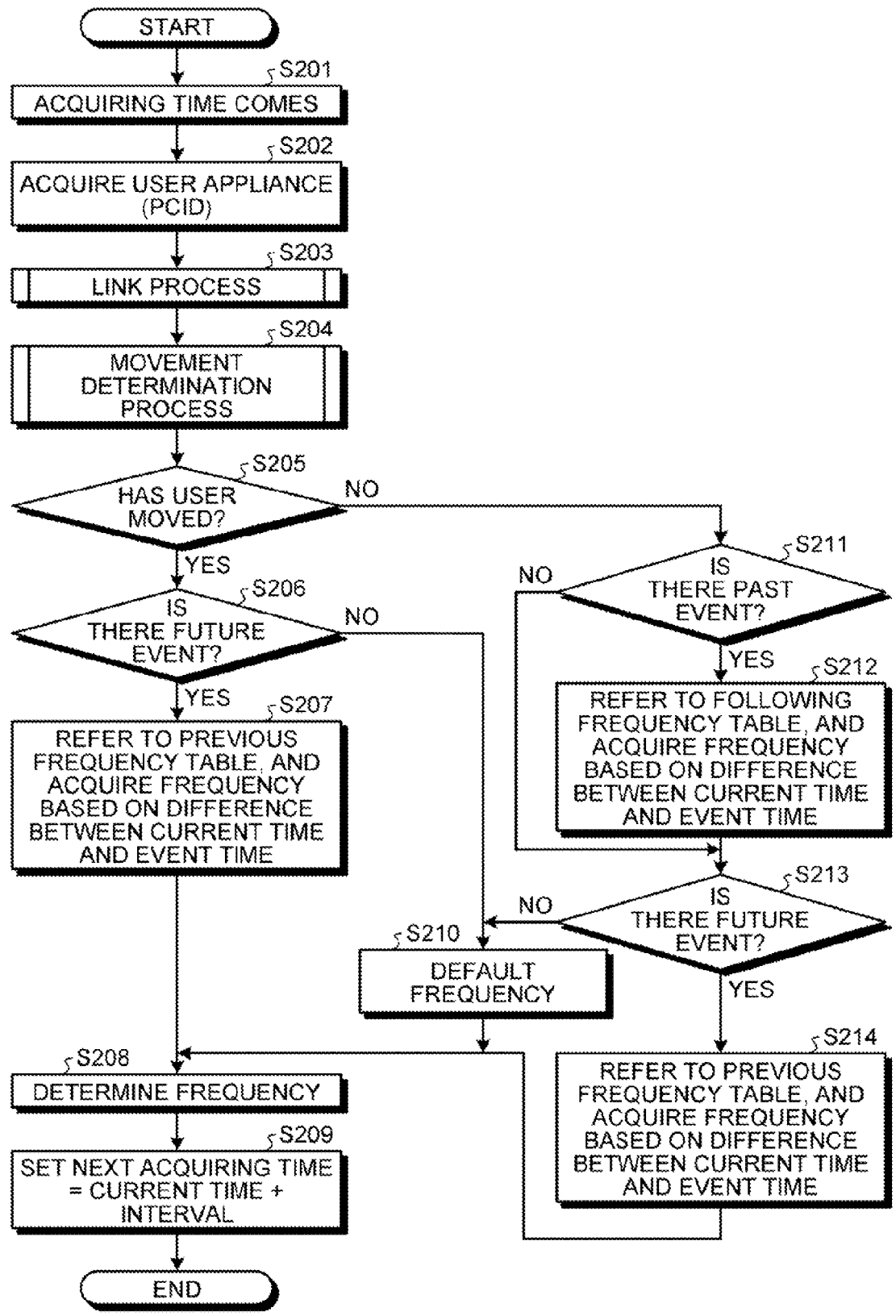
FIG. 14 is a flowchart illustrating a flow of a frequency control process.

FIG. 14 is a flowchart illustrating a flow the frequency control process. As illustrated in FIG. 14, when an acquiring time comes (S201), the link processor 25 of the link device 10 refers to the user appliance table 13 through the link result acquiring unit 24 and the frequency control unit 23 to acquire a PCID to be linked (S202).

The link processor 25 then performs the link process (S203). At this time, the link processor 25 updates the link result table 20 with the acquired link result.

Thereafter, the movement detection unit 22 performs the movement determination process by using the link result (S204). If it is determined as a result of the movement determination process that there has been a movement of the user (S205 Yes), the frequency control unit 23 determines whether there is a future event or not (S206). For example, the frequency control unit 23 inquires at the event detection unit 21 whether there is a scheduled event or not, and determines whether there is a future event based on the inquiry result obtained from the event detection unit 21.

Then, if there is a future event (S206 Yes), the frequency control unit 23 refers to the previous frequency table 14, acquires a frequency associated with a difference between the current time and the event time (S207), and determines the frequency of notification of the acquired frequency (S208). The link processor 25 thereafter adds the determined interval to the current time, and determines the resultant time to be the next acquiring time (S209).

On the other hand, if there is no future event (S206 No), the frequency control unit 23 acquires a default frequency (S210) and determines the acquired frequency to be the frequency of the control target (S208). The link processor 25 thereafter adds the determined interval to the current time, and determines the resultant time to be the next acquiring time (S209). The default frequency used here is a default frequency previously stored in a memory of the like.

If it has been determined that there is no movement of the user as a result of the movement determination process (S205 No) in S205, the frequency control unit 23 determines whether there is a past event or not (S211). For example, the frequency control unit 23 inquires at the event detection unit 21 if there is any scheduled event that is supposed to have occurred but not yet occurred to determine whether there is a past event or not based on the inquiry result obtained from the event detection unit 21.

Then if there is a past event (S211 Yes), the frequency control unit 23 refers to the following frequency table 15, and acquires a frequency associated with a difference between the current time and the event time (S212). The frequency control unit 23 thereafter determines whether there is a future event or not (S213).

Then, if there is a future event (S213 Yes), the frequency control unit 23 refers to the previous frequency table 14, and acquires a frequency associated with a difference between the current time and the event time (S214). The frequency control unit 23 thereafter compares the frequency acquired from the following frequency table 15 and the frequency acquired from the previous frequency table 14, and determines the larger frequency to be the frequency of the control target (S208). The link processor 25 thereafter adds the determined interval to the current time, and determines the resultant time to be the next acquiring time (S209).

On the other hand, if there is no future event (S213 No) in S213, the frequency control unit 23 acquires the default frequency (S210), compares the frequency acquired from the following frequency table 15 and the default frequency, and determines the larger frequency to be the frequency of the control target (S208). The link processor 25 thereafter adds the determined interval to the current time, and determines the resultant time to be the next acquiring time (S209).

Note that if it has been determined that there is no past event (S211 No) in S211, the frequency control unit 23 performs S213 skipping S212.

Specific Example

Next, a specific example of the frequency determination performed by the link device 10 will be described. FIG. 15 is a diagram for explaining a specific example of the frequency determination. The "Position" in FIG. 15 indicates a position of a user, and "Change" therein indicates if there is a detected movement or not.

As illustrated in FIG. 15, when the acquiring time "00:00:00" comes, the link device 10 identifies from the scheduler 12 that a scheduled event is "arrival at work" at "08:40:00". Based on the link result at this time, the link device 10 determines that "Position" is "unknown" and "Change" is "none" since a movement is not detected and a destination is unknown. The link device 10 then refers to the previous frequency table 14 to calculate the difference between the current time "00:00:00" and the scheduled time of the event "08:40:00" to be 8 hours and 40 minutes, and identifies the interval to be "1 hour" associated with eight hours and 40 minutes. The link device 10 then determines the "interval" to be "1 hour", and determines the next determination time to be "01:00:00".

Thereafter, at "01:00:00", "02:00:00", "03:00:00", "04:00:00", "05:00:00", "06:00:00", and "07:00:00", the link device 10 also performs a similar process performed at "00:00:00" to obtain similar determination result.

Then, when the acquiring time "00:00:00" comes, the link device 10 identifies from the scheduler 12 that there is a scheduled event at "08:40:00". The link device 10 then refers to the previous frequency table 14 to calculate the difference between the current time "08:00:00" and the scheduled time of the event "08:40:00" to be 40 minutes, and identifies the interval to be "5 minutes" associated with 40 minutes. The link device 10 then determines the "interval" to be "5 minutes" and the next determination time to be "08:05:00". Based on the link result at this time, the link device 10 determines that "Position" is "unknown" and "Change" is "none" since a movement is not detected and a destination is unknown.

Thereafter, at "08:05:00", "08:10:00", "08:15:00", "08:20:00", "08:25:00", and "08:30:00", the link device 10 also performs a similar process performed at "00:00:00" to obtain similar determination result. Then the user arrives at work and powers on a PC on his/her desk at "08:31:00".

On the other hand, the link device 10 detects a movement of the user, which is an arrival at work, from the result of the link process at "08:35:00" and determines that "Position" is "user's desk", and "Change" is "changed". The link device 10 also identifies from the scheduler 12 that the next scheduled event is "Start of meeting" at "10:00:00". The link device 10 then refers to the previous frequency table 14 to calculate the difference between the current time "08:35:00" and the scheduled time of the event "10:00:00" to be 1 hour and 25 minutes, and identifies the interval to be "1 hour" associated with 1 hour 25 minutes. The link device 10 then determines the "interval" to be "1 hour", and determines the next determination time to be "09:35:00".

Then, when the acquiring time "09:35:00" comes, the link device 10 identifies from the scheduler 12 that there is a scheduled event at "10:00:00". The link device 10 then refers to the previous frequency table 14 to calculate the difference between the current time "09:35:00" and the scheduled time of the event "10:00:00" to be 25 minutes, and identifies the interval to be "5 minutes" associated with 25 minutes. The link device 10 then determines the "interval" to be "5 minutes" and the next determination time to be "09:40:00". Based on the link result at this time, the link device 10 determines that "Position" is "user's desk" and "Change" is "none" since a movement is not detected and the user stays at his/her desk.

Thereafter, at "09:40:00", "09:45:00", "09:50:00", and "09:55:00", the link device 10 also performs a similar process performed at "09:35:00" to obtain similar determination result. Here, it is assumed that the user has not moved from his/her desk, although a meeting is scheduled at a conference room.

Then, when the acquiring time "10:00:00" comes, the link device 10 determines that the user has not moved and is at his/her desk based on the link result at this time. In other words, the link device 10 determines that "Position" is "user's desk" and "Change" is "none". The link device 10 refers to the following frequency table 15 since there is a scheduled event at "10:00:00", calculates the difference between the current time "10:00:00" and the scheduled time of the event "10:00:00" to be 0 minute, and identifies the interval to be "1 minute" associated with 0 minute. The link device 10 then determines the "interval" to be "1 minute" and the next determination time to be "10:01:00".

Thereafter at "10:01:00", "10:02:00", "10:03:00", "10:04:00", "10:05:00", "10:06:00", and "10:07:00", the link device 10 also performs a similar process performed at "10:00:00" to obtain similar determination result. It is assumed that the user thereafter moves from his/her desk to the conference room at "10:07:30" and plugs his/her PC into an outlet of the conference room.

Then, when the acquiring time "10:08:00" comes, the link device 10 determines that the user has moved from his/her desk and is in the conference room based on the link result at this time. In other words, the link device 10 determines that "Position" is "conference room" and "Change" is "changed". The link device 10 refers to the previous frequency table 14 since the next scheduled event is at "12:00:00", and identifies the interval to be "1 hour" associated with the difference between the current time "10:08:00" and the scheduled time of the event "12:00:00". The link device 10 then determines the "interval" to be "1 hour" and the next determination time to be "11:08:00". In this way, the link process adjusts the link frequency in consideration of movements and a schedule of a user, and the like.

Effect

As described above, the link device 10 controls the frequency to perform the link by predicting a time to move referring to a schedule of a user for whom link information is determined, and also by determining whether the scheduled movement has been performed. In addition, the link device 10 increases the frequency as the time difference between the current time and a scheduled time decreases, sets the frequency back when a movement is detected to control a new performance frequency based on the time difference with the next schedule. As a result, the link device 10 can appropriately control the frequency of performing the link process.

In the example of FIG. 15, position information is updated with an accuracy of 1 minute to 5 minutes with respect to the actual movements of the user, for example. When the technique of this embodiment is not used, link calculation is performed 609 times if the real time performance is at the interval of 1 minute from 0:00 to 10:08, and 123 times if the real time performance is at the interval of 5 minutes from 0:00 to 10:10. However, the link calculation is performed 30 times with the use of the technique of this embodiment.

[b] Second Embodiment

In the first embodiment, an example of controlling the frequency of performing the link process is described, but the invention is not limited thereto and it is also possible to reduce the load of the link process by narrowing down targets of the link process, for example. Thus, in the second embodiment, an example of narrowing down outlets as targets of the link process will be described.

Figure 16:
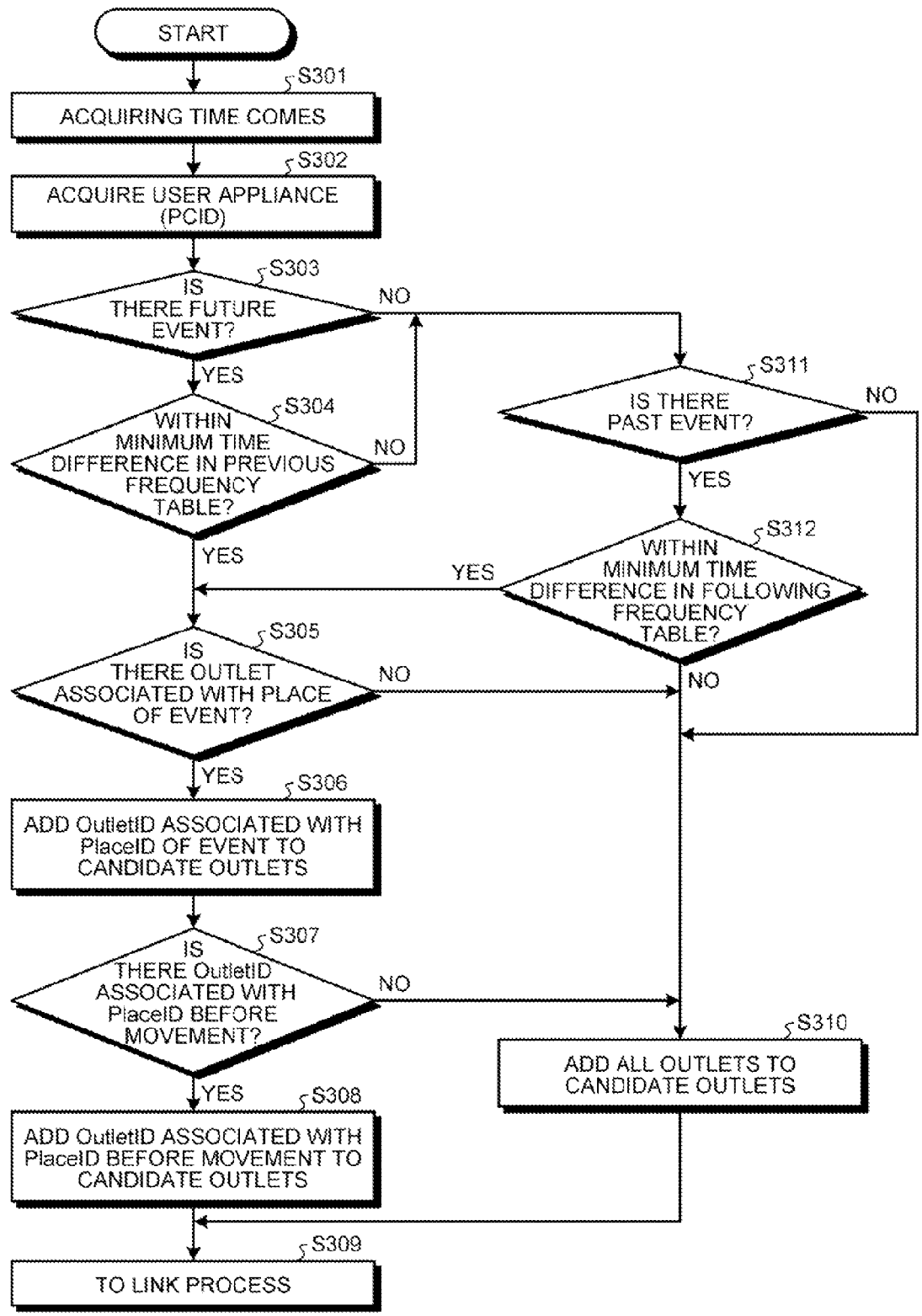
FIG. 16 is a flowchart illustrating a flow of an outlet-narrow-down process according to a second embodiment.

FIG. 16 is a flowchart illustrating a flow of an outlet-narrow-down process according to the second embodiment. This process is a process to be performed before S203 described referring to FIG. 14. As illustrated in FIG. 16, when the acquiring time comes (S301), the frequency control unit 23 refers to the user appliance table 13 to acquire a PCID to be linked (S302).

The frequency control unit 23 thereafter determines whether there is a future event or not (S303). If there is a future event (S303 Yes), the frequency control unit 23 determines whether the frequency obtained based on the time difference is within the minimum time in the previous frequency table 14 or not (S304).

Then, if the frequency control unit 23 determines that the frequency obtained based on the time difference is within the minimum time in the previous frequency table 14 (S304 Yes), it determines whether there is an outlet associated with a place of the event (S305). In other words, the frequency control unit 23 refers to the scheduler 12 to identify a PlaceID associated with the event, and determines whether the PlaceID is stored in the outlet place table 18 or not.

If the frequency control unit 23 determines that there is an outlet associated with the place of the event (S305 Yes), it identifies an OutletID associated with the PlaceID of the event from the outlet place table 18 and adds the OutletID to the candidate outlets (S306).

The frequency control unit 23 then refers to the position history table 19 to identify a PlaceID before the movement, and refers to the outlet place table 18 to determine whether there is an OutletID associated with the PlaceID before the movement or not (S307).

If the frequency control unit 23 determines that there is an OutletID associated with the PlaceID before the movement (S307 Yes), it identifies the OutletID associated with the PlaceID before the movement from the outlet place table 18, and adds the OutletID to the candidate outlets (S308). The frequency control unit 23 thereafter notifies the link processor 25 of the candidate outlets, and the link processor 25 performs the link process (S309).

On the other hand, if the frequency control unit 23 determines that there is no OutletID associated with the PlaceID before the movement (S307 No), it adds all outlets to the candidate outlets (S310). The frequency control unit 23 thereafter notifies the link processor 25 of the candidate outlets, and the link processor 25 performs the link process (S309).

In addition, if the frequency control unit 23 determines that there is no PlaceID associated with the event (S305 No), it adds all outlets to the candidate outlets (S310). The frequency control unit 23 thereafter notifies the link processor 25 of the candidate outlets, and the link processor 25 performs the link process (S309).

If the frequency control unit 23 determines that the frequency obtained based on the time difference is not within the minimum time in the previous frequency table 14 (S304 No), or if there is no future event (S303 No), it performs S311. In other words, the frequency control unit 23 determines whether there is a past event or not (S311), and if there is a past event (S311 Yes), it determines whether a frequency obtained based on the time difference is within the minimum time in the following frequency table 15 or not (S312).

Then, if the frequency control unit 23 determines that the frequency obtained based on the time difference is within the minimum time in the following frequency table 15 (S312 Yes), it performs S305 and the following steps. On the other hand, if the frequency control unit 23 determines that the frequency obtained based on the time difference is not within the minimum time in the following frequency table 15 (S312 No), or if there is no past event (S311 No), it performs S310.

As described above, outlets to be linked can be narrowed down, and thus the load of processing the link frequency can be reduced. In addition, because of the reduced load of processing the link frequency, it can be easier to secure scalability comparing to conventional techniques even when the frequency of the link process is high.

[c] Third Embodiment

Although an example of controlling frequency of performing the link process is described in the first embodiment, the invention is not limited thereto and it is also possible to improve the link accuracy by learning places where outlets are placed. Therefore, an example of learning places of outlets will be described in the third embodiment. Note that this learning process can be performed by any processor, and may be performed by the frequency control unit 23, for example.

Figure 17:
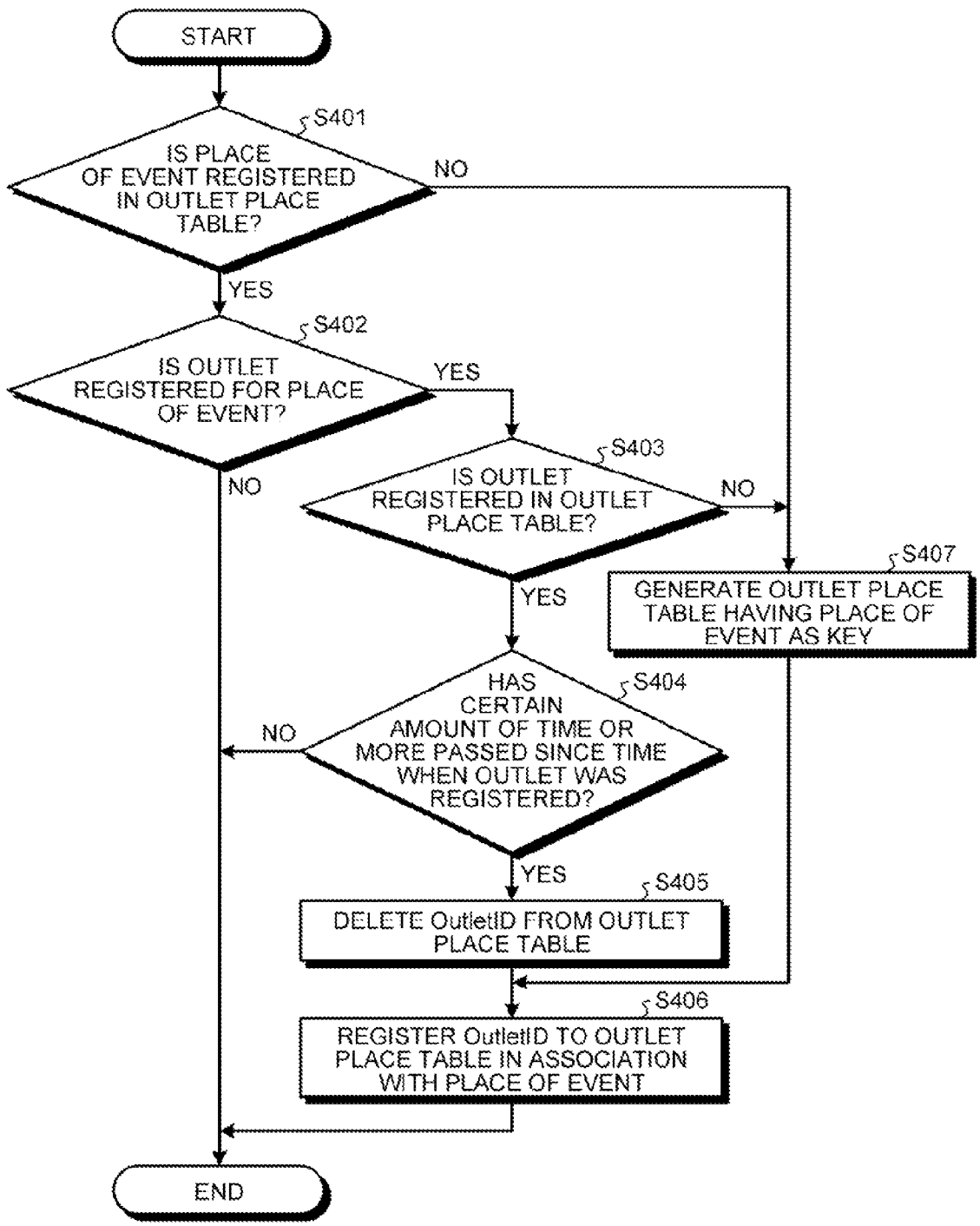
FIG. 17 is a flowchart illustrating a process flow of learning places of outlets according to a third embodiment.

FIG. 17 is a flowchart illustrating a process flow of learning places of outlets according to the third embodiment. As illustrated in FIG. 17, the link device 10 determines whether a place of event is registered in the outlet place table 18 or not (S401). For example, the link device 10 determines whether a PlaceID associated with an event in a scheduled managed by the scheduler 12 is registered in the outlet place table 18 or not.

Then, if the link device 10 determines that the place of event is registered in the outlet place table 18 (S401 Yes), it determines whether an outlet is registered for the place of the event or not (S402). For example, the link device 10 determines whether an OutletID is stored in association with the PlaceID, which is associated with the event in the schedule managed by the scheduler, in the outlet place table 18 or not.

Thereafter, if the link device 10 determines that no outlet is registered for the place of event (S402 No), it finishes the process.

On the other hand, if the link device 10 determines that an outlet is registered for the place of the event (S402 Yes), it determines whether the outlet is registered in the outlet place table 18 or not (S403). For example, the link device 10 determines whether the OutletID obtained based on the link result is registered in the outlet place table 18 or not.

Then, if the link device 10 determines that the outlet is registered in the outlet place table 18 (S403 Yes), it determines whether a certain amount of time or more has passed since the time when the outlet was registered or not (S404).

If a certain amount of time or more has passed since the outlet was registered to the outlet place table 18 (S404 Yes), the link device 10 deletes the OutletID obtained based on the link result from the outlet place table 18 (S405). The link device 10 thereafter registers the OutletID obtained based on the link result to the outlet place table 18 in association with the place of the event (S406).

On the other hand, if a certain amount of time or more has not passed since the time when the outlet was registered to the outlet place table 18 (S404 No) in S404, the link device 10 finishes the process. In addition, if the link device 10 determines that an outlet is not registered in the outlet place table 18 (S403 No), it generates a new record having the place of event as a key in the outlet place table 18 (S407), and then performs S406. Further, if the link device 10 determines the place of the event is not registered in the outlet place table 18 (S401 No) in S401, it performs S407 and S406.

As described above, it is possible to detect that the detected destination has not registered as outlet place information, and to register a place name acquired from the schedule in association with the outlet as new outlet place information. As a result, a place of the user can be determined accurately and at low cost.

[d] Fourth Embodiment

There has been described embodiments of the present invention, but the invention may be worked in a lot of different embodiments other than those as described above. Therefore, different embodiments will be described below.

Representative PC

For example, in a case of one user uses a plurality of electronic appliances, the link device 10 can determine whether the user has moved or not by any technique. The link device 10 may detect that the user has moved when a movement of one electronic appliance is detected. In addition, the link device 10 may detect that the user has moved when movements of all electronic appliances are detected. Further, the link device 10 may give priorities to the electronic appliance, and it may detect that the user has moved when a movement of an electronic appliance having a priority higher than a predetermined value.

Scheduler Registration

For example, it is assumed that a PlaceID is not registered for an event in the scheduler 12, and that an OutletID that is used by a user identified based on a link result to is stored in the outlet place table 18. In this case, the link device 10 registers a PlaceID associated with the OutletID in the outlet place table 18 to the scheduler 12 as the PlaceID of the event. As a result, a user position can be determined accurately and at low cost.

System

In addition, in the respective processes described in this embodiment, all or a part of the processes described to be performed automatically may be performed manually. Alternatively, all or a part of the processes described to be performed manually may be performed automatically by a known method. Further, information including the process steps, the control steps, specific names, and various data and parameters that are provided in this document above and in the drawings may be arbitrarily changed unless otherwise noted.

In addition, the respective components of the respective devices that are illustrated are functional concepts, and are not necessarily configured physically as illustrated. In other words, a specific form of distribution/integration of respective devices is not limited as illustrated in the drawings. Which means that, all or a part of the devices may be functionally or physically distributed/integrated in arbitral units corresponding to various loads or usage. Further, all or an arbitral part of respective process functions performed by the respective devices may be realized by a CPU and a program that is analyzed and executed by the CPU, or may be realized as a hardware using wired logics.

Hardware Configuration

The various processes described in the above embodiments may be realized by executing a previously provided program on a computer system such as a personal computer or a workstation. Therefore, an example of a computer on which a program having functions similar to the above embodiments is executed will be described below.

Figure 18:
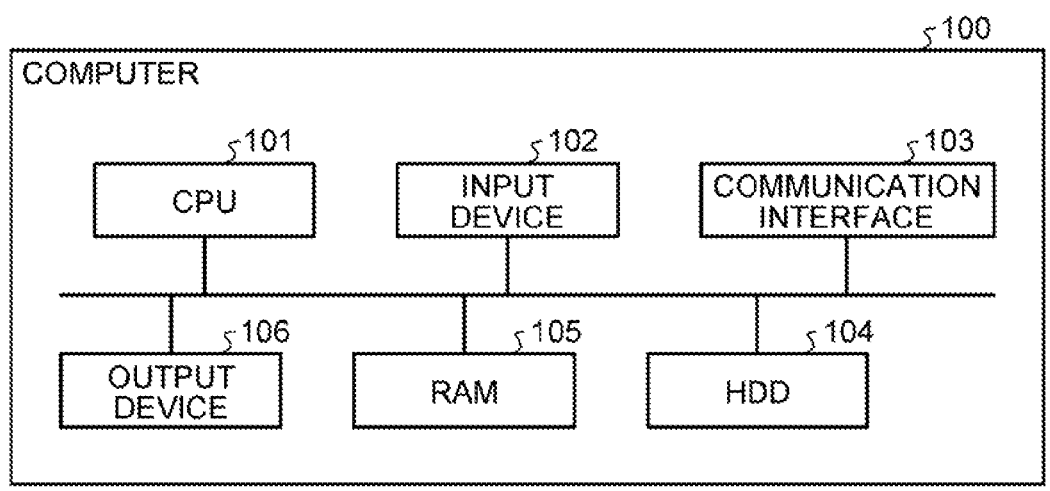
FIG. 18 is a diagram illustrating an example of a hardware configuration.

FIG. 18 is a diagram illustrating an example of hardware configuration. As illustrated in FIG. 18, a computer 100 has a CPU 101, an input device 102, a communication interface 103, a HDD (Hard Disk Drive) 104, a RAM (Random Access Memory) 105, and an output device 106. The respective units illustrated in FIG. 18 are interconnected by bus.

The input device 102 may be a mouse or keyboard, the output device 106 may be a display or the like, and the communication interface 103 may be an interface such as a NIC (Network Interface Card). The HDD 104 stores a frequency control program that realizes functions similar to those of the processor as illustrated in FIG. 3, and also stores respective tables and the like described referring to FIG. 3. As an example of a record medium, the HDD 104 is exemplified, but the respective programs may be stored in another computer-readable record medium such as a ROM (Read Only Memory), a RAM, a CD-ROM and the like, and may be read by a computer. In addition, a record medium may be positioned at a remote location, and a computer may access the record medium to acquire and use programs. Further, at that time, the computer may store the acquired programs in a record medium of the computer itself.

A CPU 101 reads the frequency control program that realizes functions similar to those of the processor illustrated in FIG. 3, and executes the program on the RAM 105 so as to perform the frequency control process that realizes respective functions described referring to FIG. 3 or the like. In other words, the frequency control process realizes the event detection unit 21, the movement detection unit 22, the frequency control unit 23, the link result acquiring unit 24, and the link processor 25 described referring to FIG. 3. As described above, the computer 100 operates as an information processing device that executes the frequency control method by reading and executing the program.

In addition, the computer 100 can realize functions similar to the above embodiments by reading the frequency control program from a record medium and executing the read frequency control program. A program referred in other embodiments is not limited to be executed by the computer 100. For example, the present invention may be similarly applied to a case where another computer or another server executes the program or a case where they execute the program in cooperation.

According to an aspect of the frequency control device, the frequency control method, and the frequency control program disclosed by the present application, there is an effect that the frequency of performing the link process can be appropriately controlled.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A frequency control device comprising:
   a communication control unit that is connected to an electronic appliance of a user and to a plurality of outlets, to each of which the electronic appliance is connectable to be supplied with electricity;
   a link processor that performs a link process to associate one of the plurality of outlets with an electric appliance based on information obtained from the plurality of outlets and the electronic appliance by the communication control unit, the link processor performs the link process at a predetermined frequency;

a storage unit that stores a scheduled time of an event for which a user is to attend;

a movement detection unit that detects a movement of the user based on an association between the plurality of outlets and the electric appliance made by the link processor;

a first changing unit that, when a current time is before the scheduled time, increases the predetermined frequency as a difference between the scheduled time and the current time decreases; and a second changing unit that, when the current time is after the scheduled time and the movement detection unit has not detected the movement of the user to a position corresponding to the event, increases the predetermined frequency.

2. The frequency control device according to claim 1 wherein:

the storage unit further stores a place of the event for which the user is to attend and information on an outlet installed in the place of the event;

an identification unit that identifies, when the current time is before the scheduled time, information on the outlet installed in the place of the event; and a narrow-down control unit that narrows down outlets as targets of the link process to the outlet whose information is identified by the identification unit.

3. The frequency control device according to claim 2, further comprising a place learning unit that stores the outlet identified by the link process and the place of destination detected by the movement detection unit in association with each other in the storage unit when the place of destination detected by the movement detection unit is not stored in the storage unit.

4. The frequency control device according to claim 1, wherein when the user uses a plurality of electronic appliances, the movement detection unit detects that the user has moved when it detects that any one of the electronic appliances has moved or when all of the plurality of electronic appliances have moved based on the result of the link process.

5. The frequency control device according to claim 2, wherein the event detection unit identifies, from the storage unit, place information associated with information of an outlet obtained based on the result of the link process when the place of the event is not stored in the storage unit, and the event detection unit registers the identified place to the storage unit in association with the event.

6. A frequency control method performed by a computer, the method comprising:

obtaining, by a communication control unit connectable to an electronic appliance of a user and to a plurality of outlets, information from the plurality of outlets and the electronic appliance of the user which is connectable to the plurality of outlets to be supplied with electricity;

performing a link process at a predetermined frequency to associate one of the plurality of outlets with the electric appliance based on the information obtained in the obtaining;

storing a scheduled time of an event for which the user is to attend;

detecting a movement of the user based on an association between the plurality of outlets and the electric appliance made in the performing;

increasing, when a current time is before the scheduled time, the predetermined frequency as a difference between the scheduled time and the current time decreases; and increasing, when the current time is after the scheduled time and the movement of the user to a position corresponding to the event has not been detected the predetermined frequency.

7. A computer-readable recording medium having stored therein a program for causing a computer to execute a frequency control process comprising:

obtaining, by a communication control unit connectable to an electronic appliance of a user and to a plurality of outlets, information from the plurality of outlets and the electronic appliance of the user which is connectable to the plurality of outlets to be supplied with electricity;

performing a link process at a predetermined frequency to associate one of the plurality of outlets with the electric appliance based on the information obtained in the obtaining;

storing a scheduled time of an event for which the user is to attend;

detecting a movement of the user based on an association between the plurality of outlets and the electric appliance made in the performing;

increasing, when a current time is before the scheduled time, the predetermined frequency as a difference between the scheduled time and the current time decreases; and increasing, when the current time is after the scheduled time and the movement of the user to a position corresponding to the event has not been detected, the predetermined frequency.

* * * * *